July 21, 1953 S. BENZER ET AL 2,646,536
RECTIFIER
Filed Nov. 14, 1946
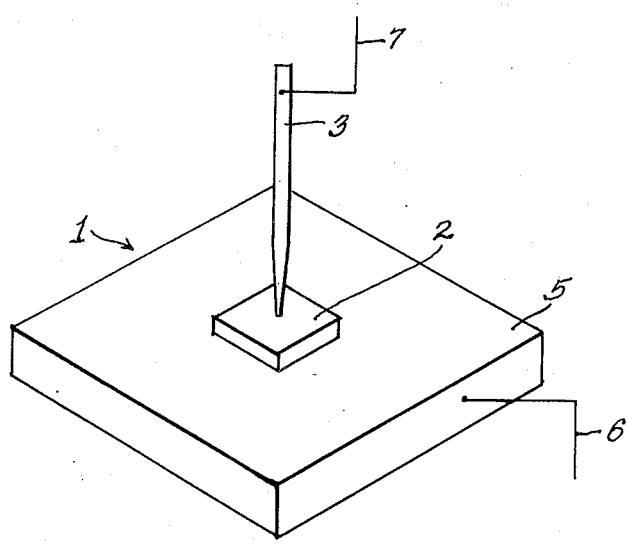
Inventors:
Seymour Benzer.
Karl Lark-Horovitz.
By Brown Jackson Boettcher Dienner
Att'ys.

Patented July 21, 1953

2,646,536

UNITED STATES PATENT OFFICE 2,646,536

RECTIFIER

Seymour Benzer, West Lafayette, and Karl Lark-Horovitz, Lafayette, Ind., assignors to Purdue Research Foundation, Lafayette, Ind., a corporation of Indiana Application November 14, 1946, Serial No. 709,742

29 Claims. (Cl. 317—236)

Our present invention relates to an improvement in rectifiers.

In the copending application of Karl Lark-Horovitz, one of the present joint applicants, and Randall M. Whaley, Serial No. 604,744, filed July 13, 1945, now Patent No. 2,514,879, and in the copending application of Seymour Benzer, the other of the present joint applicants, Serial No. 642,960, filed January 23, 1946, there are disclosed contact type rectifiers comprising an electrode or whisker and a semi-conductor or crystal made of an alloy of germanium with the surface of which the electrode or whisker has contact. In the applications above referred to the several elements or impurities which are combined with germanium are not all metals so that the resultant materials are not alloys in the common meaning of that word. However, as in the disclosures of the above applications and in the present application the words "alloy of germanium" mean to include a union of two or more elements, one of which is germanium, and the other or others being metals, non-metals or gases, and the combination of which exhibits electrical properties such as are found in metals and semi-conductors. Also, the word metal as used herein means to include alloys in the sense above defined as well as pure metallic elements.

The rectifiers of the above referred to applications embody semi-conductors of the N type, i. e., they present high resistance to current flow across the rectifying contact when the semi-conductor is positive and the contacting metal electrode or whisker is negative, and a lower resistance when the potential is reversed. In general rectifying contacts may be found in the alloys of the above applications which exhibit peak back voltages, i. e., in the high resistance direction of current flow within a range of 5 to 200 volts without the passage of any appreciable current and of resistances ranging from 10,000 ohms to several megohms measured at about 5 volts which resistances are substantially maintained nearly to the back peak voltage. These rectifying contacts further exhibit good forward conductance with the currents passed at one volt generally lying within the range of 5 to 40 milliamperes.

We have discovered that in the rectifiers of the above applications that the contacting metal electrodes or whiskers may be welded to the semi-conductors at selected points of contact and which welding of the metal electrode or whisker to the semi-conductors increases the mechanical and electrical stability of the rectifiers, and in addition makes it possible to rectify large currents without injury to the rectifiers. This welding is accomplished by passing current through the device in an amount to provide sufficient heat to effect a weld. It has been found that direct current of a range of .1 to 1 ampere at about 5 volts and for a few seconds is sufficient to effect a weld and that although the current is substantial it improves rather than impairs the device. Alternating current may be used, if desired, with the values being substantially the same as for direct current.

It is an object of our invention therefore to provide a rectifier comprising a semi-conductor and a contacting metal electrode or whisker of dissimilar metals welded to each other at a selected point of contact between the metal electrode or whisker with the semi-conductor.

A further object of our invention is to provide a rectifier comprising a metal semi-conductor consisting of an alloy of germanium on the surface of which points may be found having the characteristic of high resistance to current flow in one direction therethrough and low resistance to current flow in the other direction therethrough and a contacting metal electrode or whisker having contact with such a point on the semi-conductor, and with the metal electrode or whisker and the semi-conductor being welded to each other at that point.

The above and other objects and advantages of our invention will appear from the detail description.

Now in order to acquaint those skilled in the art with the manner of constructing and utilizing rectifiers in accordance with our present invention we shall describe in connection with the accompanying drawing in detail certain preferred embodiments of our invention.

The single figure of the drawing illustrates diagrammatically a rectifier constructed in accordance with our invention.

As above related the rectifier 1 of our present invention comprises a semi-conductor 2 made of an alloy of germanium and an electrode or whisker 3 the pointed end of which has contact with a selected point on the surface of the semi-conductor 2. The semi-conductor 2 is suitably secured in good electric contact with a conductor plate 5. Leads 6 and 7 are suitably secured to the conductor plate 5 and whisker 3, respectively, for connection of the device in circuit.

In the application first above referred to and to which reference may be had it is disclosed that germanium may be alloyed with small amounts of one of the following elements or certain combinations thereof:

Copper and silver of column I of the periodic table;
Magnesium, calcium, zinc, strontium, cadmium or barium of column II of the periodic table;
Titantium, tin or lead of column IV of the periodic table;
Nitrogen, vanadium, columbium, tantalum, or bismuth of column V of the periodic table;
Chromium or uranium of column VI of the periodic table; and
Cobalt, nickel, or palladium of column VIII of the periodic table.

In the above alloys when utilized as a semi-conductor in a contact type rectifier points of contact may be found which exhibit high back voltages in excess of ten volts.

Further, reference may be had to the above referred to copending application of Seymour Benzer for disclosures of alloys of germanium having utility for our present invention.

After preparation of the alloys they are preferably ground and etched in any suitable manner with preferred grinding and etching compositions and procedures being related in detail in the applications referred to. The grinding and etching of the alloys facilitates the finding of good points of contact thereon, i. e., good from the standpoint of providing contact type rectifiers, although if desired this may also be accomplished by breaking open of a melt which then presents a surface upon which desired points of contact may be found. The selected germanium alloy may then be soldered or otherwise suitably secured to a conductor plate made of metal preferably having low resistance and non-rectifying contact with the semi-conductor and this assembly serving as the semi-conductor member of a rectifier. The alloy is preferably secured to the conductor plate for convenience of mounting it in a contact type rectifier and with the conductor plate serving to provide for the attachment or connection of a lead thereto.

The rectifier, as above noted, further comprises a sharpened metal wire forming a metal electrode or whisker 3 which is adapted to have contact with a selected point on the exposed surface of the semi-conductor possessing the desired rectifying properties. The metal wire electrode or whisker preferably is provided with a sharp pointed end having a tip diameter of the order of 0.001". These electrodes may be readily made by forming suitable points on wires of about 0.005" in diameter. The electrode or whisker 3 may be supported in any suitable manner and after a selected point of contact of the tip of the wire with the surface of the semi-conductor is found the electrode or whisker is welded to the semi-conductor. Not all metal wires normally satisfactory for use as electrodes or whiskers will weld with the germanium alloy semi-conductors. However, we have found that electrodes or whiskers made of gold, platinum, platinum-iridium alloy (about 10% iridium) and tungsten may be satisfactorily welded to the germanium alloy semi-conductors.

Preferably welding of the electrode or whisker to the germanium alloy semi-conductor is accomplished by passing current through the selected rectifying contact between the electrode and semi-conductor. This may be achieved with either direct current or ordinary 60 cycle alternating current. A current of 0.1 to 1 ampere under the voltage and time previously noted provides sufficient heat to effect a weld between wires of about 0.005" in diameter and having a tip diameter as aforesaid of about 0.001" with the semi-conductor. It will be understood that the values of current, voltage and time above given are typical and may be varied to achieve satisfactory welding of the whiskers and semi-conductors.

In rectifiers constructed as above described a substantially permanent and fixed connection is provided between the metal electrode or whisker and semi-conductor so that the device has substantial mechanical and electrical stability and requires considerable force to separate the parts.

In welded contact rectifiers made in accordance with our invention typical current carrying capacities of 0.4 ampere and 0.7 ampere of rectified current were observed so that the devices are as previously noted adapted for the rectification of substantial currents without injury to the devices.

While we have disclosed what we consider to be the preferred embodiments of our invention it will be understood that various modifications may be made therein without departing from the spirit and scope of our invention.

We claim:

1. A rectifier comprising a semi-conductor and a pair of metal electrode elements in electrical contact therewith, one of said electrode elements contacting said semi-conductor in substantially punctiform fashion for producing a rectifying contact and being welded to said semi-conductor.

2. A rectifier comprising a semi-conductor consisting of an alloy of germanium, and a pair of metal electrode elements in electrical contact with said semi-conductor, one of said electrode elements being of substantially punctiform character for producing a rectifying contact and being welded to the semi-conductor at its point of contact therewith.

3. A rectifier comprising a semi-conductor consisting of an alloy of germanium, a contact electrode element of punctiform type consisting of a member selected from the group consisting of gold, platinum, platinum-iridium, and tungsten supported in electrical contact with said semi-conductor and welded to said semi-conductor at its point of contact, and a second electrode element also in electrical contact with said semi-conductor at a different area thereof.

4. A rectifier comprising a semi-conductor consisting of an alloy of germanium and a metal wire electrode having a tip diameter of less than 0.005" and having contact at its tip with the surface of said semi-conductor, and with the tip of said electrode and said semi-conductor being welded to each other, and a second electrode element in contact with a different surface area of said semi-conductor.

5. The rectifier of claim 4 characterized by said metal electrode consisting of a member of the group consisting of gold, platinum, platinum-iridium, and tungsten.

6. A rectifier comprising a semi-conductor consisting of an alloy of germanium, a first electrode consisting of a member of the group consisting of gold, platinum, platinum-iridium, and tungsten characterized by said first electrode forms a rectifying contact with said semi-conductor at substantially a point area of contact only and is welded to the semi-conductor at its point of contact, and a second electrode element also in contact with the semi-conductor at a different area thereof.

7. A rectifier comprising a semiconductor consisting of an alloy of germanium, a first electrode consisting of a member of the group consisting of gold, platinum, platinum-iridium, and tungsten characterized by said first electrode forms a rectifying contact with said semi-conductor and is welded thereto by current passed therethrough at substantially the point area of contact, and a second electrode element also in electrical contact with said semiconductor at a different area thereof.

8. A rectifier comprising a semiconductor consisting of an alloy of germanium, a first substantially point-like electrode element consisting of a member of the group consisting of gold, platinum, platinum-iridium and tungsten characterized by said electrode element and said semi-conductor being in contact with each other at substantially a point only for forming a rectifying contact and being welded to each other by current of the order of 0.1 to 1 ampere passed therethrough and a second electrode element also in electrical contact with the semiconductor at a different area thereof.

9. A rectifier comprising a metallic alloy semiconductor element, a metal electrode element of substantially point-like character and forming a rectifying contact each of said elements being of dissimilar metals and characterized by being in electrical contact with each other and welded to each other at the point of contact by passage of current therethrough and a second electrode element also in electrical contact with the semiconductor at a different area thereof.

10. A crystal rectifier comprising a pointed conductive electrode welded at the point to the surface of a semiconductive member.

11. A germanium crystal diode comprising a wire whisker with a pointed contact portion, said portion being in contact with the surface of a member comprising primarily germanium, and a welded joint bonding said portion to said surface.

12. The method of making stable the characteristics of a crystal diode which comprises passing through the rectifying contact a direct current of sufficient intensity to weld the electrode together at said contact.

13. The method of joining a pointed contact portion of a contact member to a germanium crystal element to form a rectifying connection therebetween which comprises welding said member at said contact portion to the surface of said element.

14. A high voltage germanium crystal rectifier comprising a sharpened electrode welded at its sharpened end to the surface of a member of germanium.

15. A high voltage germanium crystal rectifier comprising a sharpened electrode welded at its sharpened end to a member of germanium with tin as a donor.

16. A point-to-plane rectifier comprising a pointed electrode welded at its point to the surface of a substantially planar electrode.

17. A rectifier comprising a semi-conductor, and a pointed counterelectrode in welded contact with said semiconductor, the point of said counterelectrode comprising an alloy including the material of said semiconductor.

18. An asymmetrically conductive device comprising a wire whisker with a pointed contact portion, said portion being in contact with the surface of a member comprising germanium, and a welded joint bonding said portion to said surface.

19. The method of making an asymmetrically conductive semiconductor circuit element which comprises pressing the sharpened end of a whisker against the surface of a semiconductor member and passing a direct current through the area of contact of sufficient intensity and for a length of time sufficient to weld together said whisker and said member.

20. In an asymmetrically conductive device comprising a semiconductor crystal member and a wire electrode in contact therewith, the method of stabilizing the contact between said electrode and said member which comprises welding said electrode to said member at said contact.

21. A semiconductor circuit element comprising a sharpened electrode welded at its sharpened end to the surface of a member comprising germanium.

22. A semiconductor circuit element comprising a sharpened electrode welded at its sharpened end to the surface of a member comprising a semiconductor containing a donor element.

23. A crystal rectifier comprising a sharpened electrode welded at its sharpened end to a member comprising germanium with an added donor.

24. An asymmetrically conductive device comprising a first member comprising primarily a semiconductive chemical element, said first member having a substantially planar surface portion, and a conductive member in contact with a small portion of said surface portion and welded to said first member at said contacted portion to form an alloy of said element and the material of said conductive member.

25. An asymmetrically conductive device comprising a semiconductive member and an electrode in contact with a discrete portion of the surface of said member, said electrode and member being fused together at said portion.

26. A rectifier comprising a semiconductor consisting of germanium with tin as a donor, and a pair of metal electrode elements in electrical contact with said semiconductor, one of said electrode elements being of substantially punctiform character for producing a rectifying contact and being welded to the semiconductor at its point of contact therewith.

27. A rectifier comprising a semiconductor and a pair of metal electrode elements in electrical contact therewith, one of said electrode elements contacting said semiconductor in substantially punctiform fashion for producing a rectifying contact and being welded to said semiconductor by a direct current passed in a forward direction through said rectifying contact.

28. A rectifier comprising a semiconductor consisting of an alloy of germanium, a first electrode consisting of a member of the group consisting of platinum, platinum-iridium, and tungsten characterized by said first electrode forms a rectifying contact with said semiconductor at substantially a point area of contact only and is welded to the semiconductor at its point of contact, and a second electrode element also in contact with the semiconductor at a different area thereof.

29. An electrical device comprising a germanium semiconductor body, a plurality of electrically conductive elements in electrical contact with said semi-conductor, one of said electrically conductive elements being fused to said germanium body and constituting a rectifying connection.

SEYMOUR BENZER.
KARL LARK-HOROVITZ.

References Cited in the file of this patent

UNITED STATES PATENTS

| Number | Name | Date |
|---|---|---|
| 1,961,825 | Harty | June 5, 1934 |
| 2,383,993 | Skinker | Sept. 4, 1945 |
| 2,402,839 | Ohl | June 25, 1946 |

OTHER REFERENCES

H. Q. North, "Final Report on K-band Germanium Crystals," NDRC 14—427, General Electric Co., March 26, 1945, released for publication March 8, 1946.

North—Journal Applied Physics, pages 912-923, vol. 17, November 1946.

H. Q. North—Final Report, "Welded Germanium Crystals," Contract OEM Sr 262, Order No. DIC—178, 554, September 20, 1945. This report apparently was made available to the general public in 1948.